No. 753,165. Patented February 23, 1904.

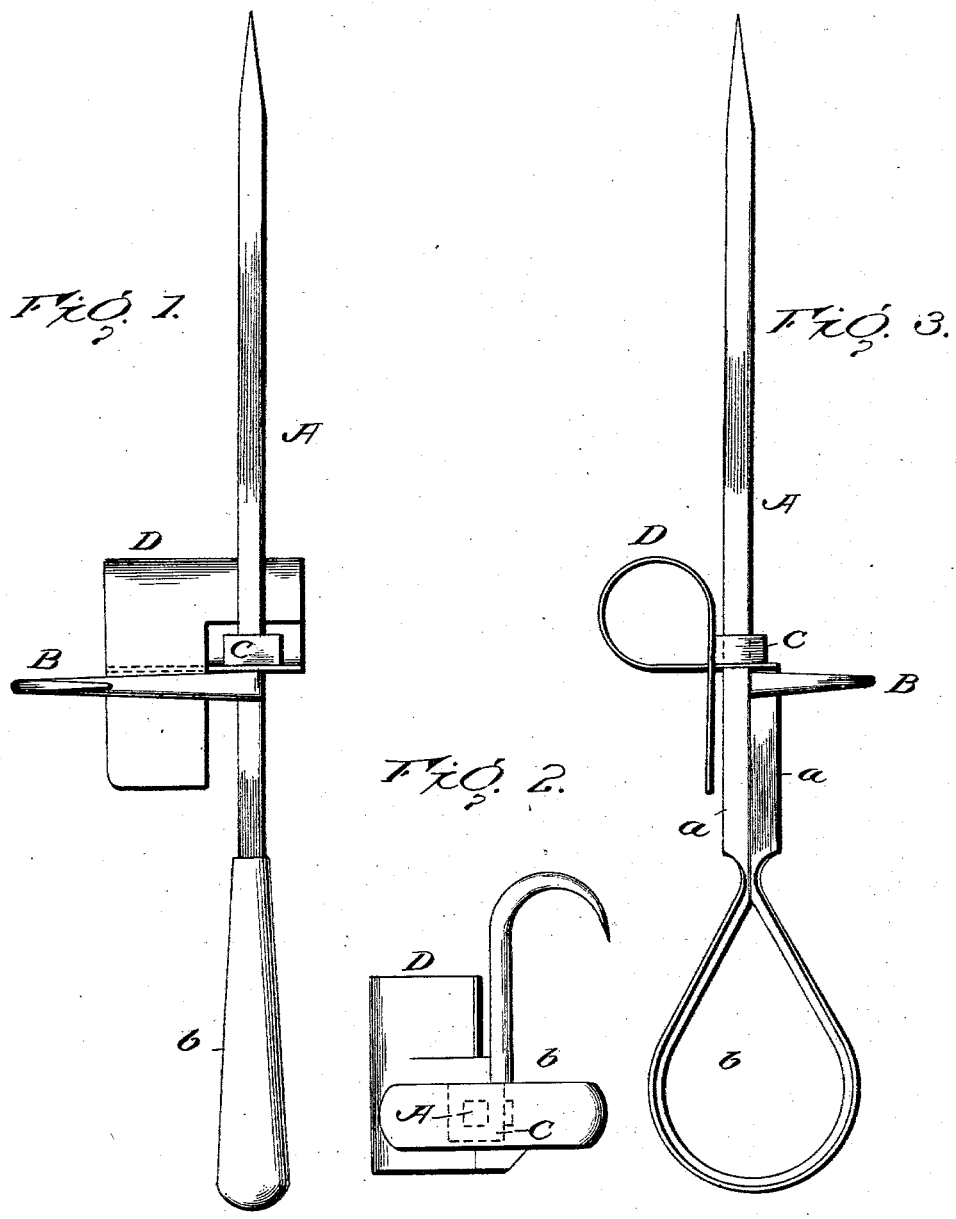

UNITED STATES PATENT OFFICE.

RICHARD HENRY RUSDEN, OF ROSSLAND, CANADA.

MINER'S CANDLESTICK.

SPECIFICATION forming part of Letters Patent No. 753,165, dated February 23, 1904.

Application filed April 1, 1903. Serial No. 150,571. (No model.)

*To all whom it may concern:*

Be it known that I, RICHARD HENRY RUSDEN, a British subject, residing at the city of Rossland, in the Province of British Columbia, Canada, have invented a new and useful Miner's Candlestick, of which the following is a specification.

My invention relates to certain new and useful improvements in miners' candlesticks of that class in which the prod and handle are formed of a single piece; and it has for its objects, among others, to provide a simple and cheap candlestick, also to facilitate the construction and to lessen the cost of production. Furthermore, I provide a right-handed implement.

Other objects and advantages of the invention will hereinafter appear and the novel features thereof will be particularly pointed out in the appended claims.

The invention is clearly illustrated in the accompanying drawings, which, with the letters of reference marked thereon, form a part of this specification, and in which—

Figure 1 is a side view of the improved candlestick. Fig. 2 is an end view thereof, and Fig. 3 is a view taken at right angles to Fig. 1.

Like letters of reference indicate like parts throughout the several views.

In carrying out my invention I construct the whole frame of the candlestick of a single piece of metal bent to form the prod A and the handle, the two parallel portions $a\ a'$ of the portion adjacent the handle $b$ being arranged in close parallel relation with each other, as seen distinctly in Fig. 3. These parallel portions may be brazed together.

B is a hook forged on the frame at right angles to the length of the prod and between the members or portions $a\ a'$, as seen clearly in Fig. 3, and D is a spring-steel thimble punched from a piece of sheet-steel and formed with a rectangular opening in which is received the prod A, one end of the material from which the thimble is formed resting against the end of the member $a'$, and then a nut C is placed upon the prod A while hot and forced up against the ends of the material forming the thimble and having a bearing against the end thereof which is in contact with the member $a'$, said nut afterward contracting and securely retaining the thimble in position. The other end of the material forming the thimble bears against the side of the nut and lies parallel with the member $a$, as seen best in Fig. 3. By this means I provide a simple, light, cheap, yet strong and efficient miner's candlestick.

What is claimed as new is—

1. A miner's candlestick having its prod and handle formed of a single piece of material with parallel members, a hook secured to said prod between said parallel members and projecting at an angle thereto, a thimble sleeved upon the prod and having a portion engaging the end of the shorter of said members, and a nut on said prod bearing against said end of the thimble.

2. A miner's candlestick having its prod and handle formed of a single piece of material with parallel members, a hook secured to said prod between said parallel members and projecting at an angle thereto, a thimble sleeved upon the prod and having a portion engaging the end of the shorter of said members, and a nut on said prod bearing against said end of the thimble, the opposite end of the material forming said thimble bearing against said nut and lying parallel with the other member.

In testimony whereof I have signed my name to this specification in the presence of two subscribing witnesses.

Dated March 19, 1903.

RICHARD HENRY RUSDEN.

Witnesses:
F. C. LAWE,
W. P. DOCDRAILL.